(12) United States Patent
Kato et al.

(10) Patent No.: US 9,088,676 B2
(45) Date of Patent: Jul. 21, 2015

(54) INFORMATION PROCESSING APPARATUS, INFORMATION PROCESSING METHOD, AND COMPUTER READABLE MEDIUM

(71) Applicant: FUJI XEROX CO., LTD., Minato-ku, Tokyo (JP)

(72) Inventors: Nobutaka Kato, Kanagawa (JP); Hiroshige Nonaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/060,809

(22) Filed: Oct. 23, 2013

(65) Prior Publication Data

US 2014/0368849 A1   Dec. 18, 2014

(30) Foreign Application Priority Data

Jun. 18, 2013   (JP) .................................. 2013-127359

(51) Int. Cl.
*G06F 15/00* (2006.01)
*H04N 1/00* (2006.01)
*H04N 1/44* (2006.01)

(52) U.S. Cl.
CPC ......... *H04N 1/00278* (2013.01); *H04N 1/4413* (2013.01)

(58) Field of Classification Search
USPC ............................................... 358/1.13–1.15
See application file for complete search history.

(56) References Cited

U.S. PATENT DOCUMENTS

2002/0044299 A1 *   4/2002   Iwase et al. .................. 358/1.15

FOREIGN PATENT DOCUMENTS

| JP | 2011-97200 A | 5/2011 |
| JP | 2012-192578 A | 10/2012 |

* cited by examiner

*Primary Examiner* — Saeid Ebrahimi Dehkord
(74) *Attorney, Agent, or Firm* — Sughrue Mion, PLLC (57) ABSTRACT

An information processing apparatus includes an obtaining unit that obtains processed data which is processed in response to a request received from a user, a determining unit that determines a mode for providing the processed data, on the basis of priority levels which are assigned in advance to plural modes for providing data by the user or a user to whom the processed data is to be provided, and on the basis of availability of each of the plural modes, and a providing unit that provides the processed data in the mode determined by the determining unit.

9 Claims, 10 Drawing Sheets

| USER ID | PASSWORD | MAIL ADDRESS | PRIORITY INFORMATION ID |
|---|---|---|---|
| U0001 | pass 1 | U0001@a.com | 0001 |
| U0002 | pass 2 | U0002@b.com | 0002 |
| U0003 | pass 3 | U0003@c.com | 0003 |
| | | | |

FIG. 5

| PRIORITY INFORMATION ID | PRIORITY LEVEL OF DATA PROVISION MODE | | | |
|---|---|---|---|---|
| | (1) TRANSMITTING BY E-MAIL | (2) STORING IN INFORMATION STORAGE MEDIUM | ... | (N) STORING IN DEVICE |
| 0001 | 1 | 3 | ... | 2 |
| 0002 | 2 | 1 | ... | 6 |
| 0003 | 1 | 2 | ... | N |
| | | | | |

| DATA ID | DATA STORAGE LOCATION | URL | PROVISION STATUS FLAG |
|---|---|---|---|
| D0001 | /Data/D0001 | http://a.com/11 | T |
|  |  | http://a.com/12 | F |
|  |  | http://a.com/13 | T |
| D0002 | /Data/D0002 | http://a.com/2 | F |

INFORMATION PROCESSING APPARATUS, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2013-127359 filed Jun. 18, 2013.

BACKGROUND

Technical Field

The present invention relates to an information processing apparatus, an information processing method, and a computer readable medium.

SUMMARY

According to an aspect of the invention, there is provided an information processing apparatus including: an obtaining unit that obtains processed data which is processed in response to a request received from a user; a determining unit that determines a mode for providing the processed data, on the basis of priority levels which are assigned in advance to plural modes for providing data by the user or a user to whom the processed data is to be provided, and on the basis of availability of each of the plural modes; and a providing unit that provides the processed data in the mode determined by the determining unit.

BRIEF DESCRIPTION OF THE DRAWINGS

An exemplary embodiment of the present invention will be described in detail based on the following figures, wherein.

DETAILED DESCRIPTION

The following describes an exemplary embodiment of the present invention (hereinafter simply referred to as an "exemplary embodiment") with reference to the accompanying drawings.

1. System Configuration

Figure 1:
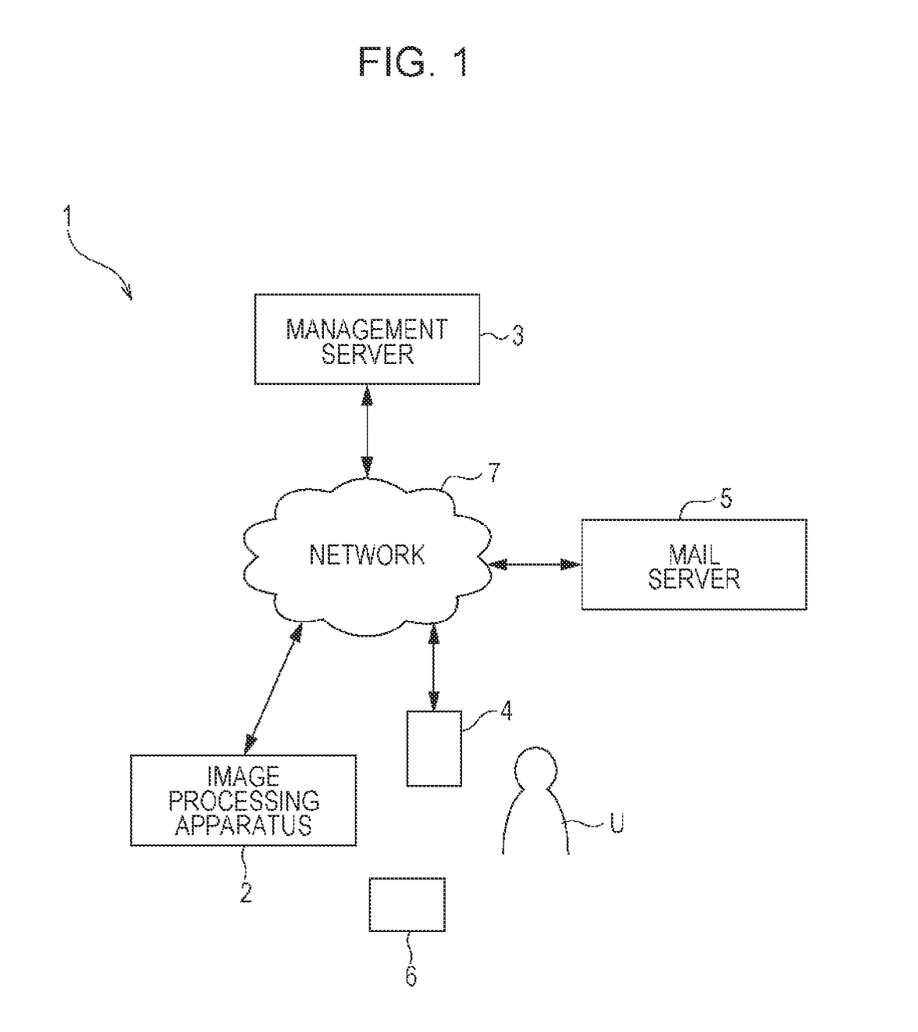
FIG. 1 is a system configuration diagram illustrating an image processing system according to an exemplary embodiment.

FIG. 1 is a system configuration diagram illustrating an image processing system 1 according to the present exemplary embodiment. The image processing system 1 according to the present exemplary embodiment includes an image processing apparatus 2 and a management server 3. The image processing apparatus 2 is connected to the management server 3 via a network 7 for data communication therebetween. The image processing apparatus 2 is also connected to a user terminal 4 operated by a user U and a mail server 5 via the network 7 for data communication therebetween. The user terminal 4 may be a cellular phone, a tablet terminal, a notebook computer, a PDA, or the like. In the present exemplary embodiment, it is assumed that a camera-equipped cellular phone is used as the user terminal 4. When the image processing apparatus 2 is connected to an information storage medium 6 such as a memory card, the image processing apparatus becomes able to read data from the information storage medium 6 and write data to the information storage medium 6.

In an aspect of the image processing system 1 according to the present exemplary embodiment, plural data provision modes may be selected, such as a first data provision mode in which the image processing apparatus 2 transmits data, which is obtained in response to an operation request (for example, a scan operation request) received from the user, to a specified address in e-mail format, a second data provision mode in which the image processing apparatus 2 stores such data in the information storage medium 6 connected thereto, and a third data provision mode in which the image processing apparatus 2 temporarily stores such data in a hard disk thereof and transmits the data to the user terminal 4 in response to a request from the user terminal 4. The image processing apparatus 2 provides the data in a data provision mode determined on the basis of the priority levels of data provision modes associated with the user who issued the operation request to the image processing apparatus 2 or the user at the address specified by the user who issued the operation request.

2. Hardware Configuration

Hereinafter, a description will be given of an example of the hardware configuration of the image processing apparatus 2 and the management server 3 of the image processing system 1 according to the present exemplary embodiment.

2-1. Image Processing Apparatus 2

Figure 2:
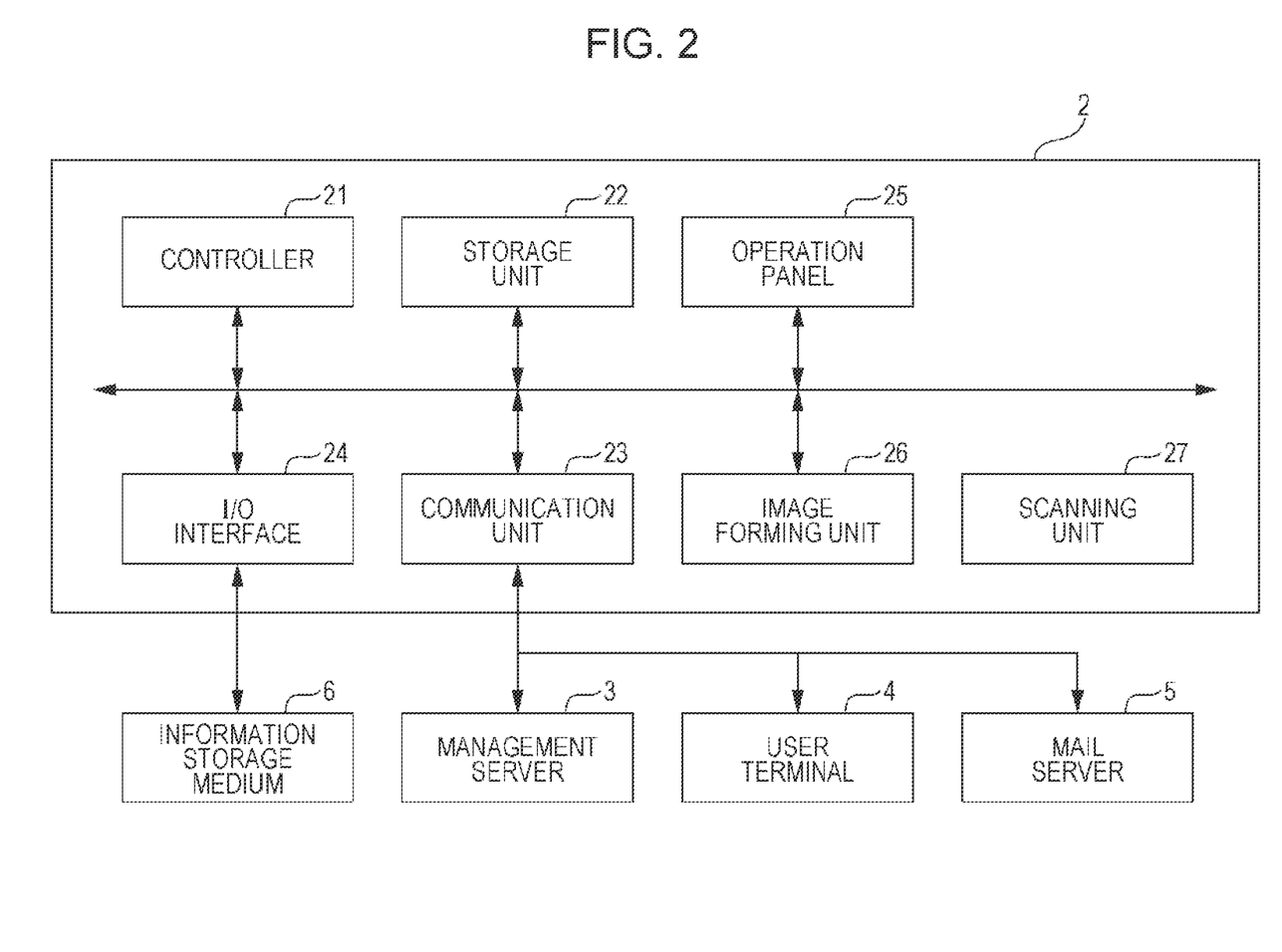
FIG. 2 is a hardware configuration diagram illustrating an image processing apparatus.

FIG. 2 illustrates an exemplary hardware configuration of the image processing apparatus 2. As illustrated in FIG. 2, the image processing apparatus 2 includes a controller 21, a storage unit 22, a communication unit 23, an input/output interface 24, an operation panel 25, an image forming unit 26, and a scanning unit 27.

The controller 21 includes a central processing unit (CPU). The controller 21 performs various types of computations and controls each unit of the image processing apparatus 2, in accordance with a program stored in the storage unit 22.

The storage unit 22 stores a control program, such as an operating system, and data of the image processing apparatus 2. The storage unit 22 also serves as a working memory for the controller 21. The program may be stored in an information storage medium, such as an optical disk, a magnetic disk, a magnetic tape, a magneto-optical disk, and a flash memory, and provided to the image processing apparatus 2. Alternatively, the program may be provided to the image processing apparatus 2 via a data communication network such as the Internet.

The communication unit 23 includes, for example, a network interface card (NIC), and communicates with the management server 3, the user terminal 4, and the mail server 5, by connecting to the network 7 via the NIC.

The input/output interface 24 is an interface for connecting to an external device or an external memory, for example. In the present exemplary embodiment, the input/output interface 24 connects to the information storage medium 6 such as a memory card.

The operation panel 25 includes an input device such as a touch panel and a keyboard, and a display device such as a liquid crystal display. The operation panel 25 receives an operation input from the user, and causes the display device to display the results (screen) of information processing performed by the controller 21.

Image forming unit 26 forms an image on a medium (for example, paper medium) to be printed, on the basis of image data specified by the controller 21.

The scanning unit 27 includes an optical system and a light receiving element, and obtains image data of a medium (for example, a paper medium) to be scanned.

2-2. Management Server 3

Figure 3:
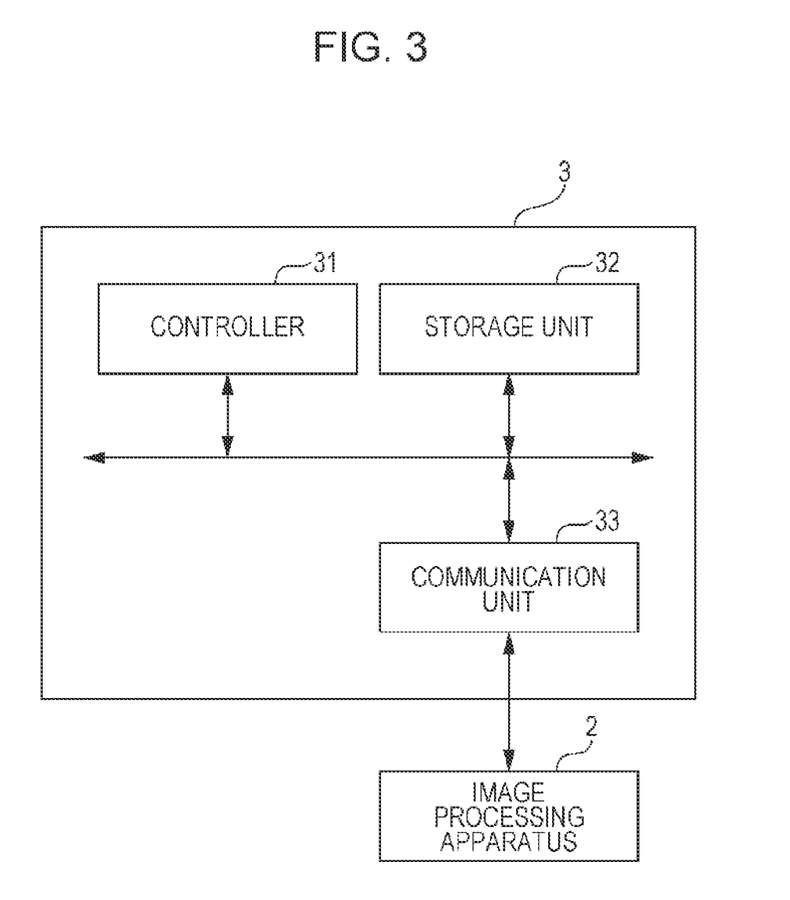
FIG. 3 is a hardware configuration diagram illustrating a management server.

Next, the hardware configuration of the management server 3 will be described. FIG. 3 illustrates an exemplary hardware configuration of the management server 3. As illustrated in FIG. 3, the management server 3 includes a controller 31, a storage unit 32, and a communication unit 33.

The controller 31 includes a central processing unit (CPU). The controller 31 performs various types of computations and controls each unit of the management server 3, in accordance with a program stored in the storage unit 32.

The storage unit 32 stores a control program, such as an operating system, and data of the management server 3. The storage unit 32 also serves as a working memory for the controller 31. The program may be stored in an information storage medium, such as an optical disk, a magnetic disk, a magnetic tape, a magneto-optical disk, and a flash memory, and provided to the management server 3. Alternatively, the program may be provided to the management server 3 via a data communication network such as the Internet. The following describes an example of data stored in the storage unit 32.

Figure 4:
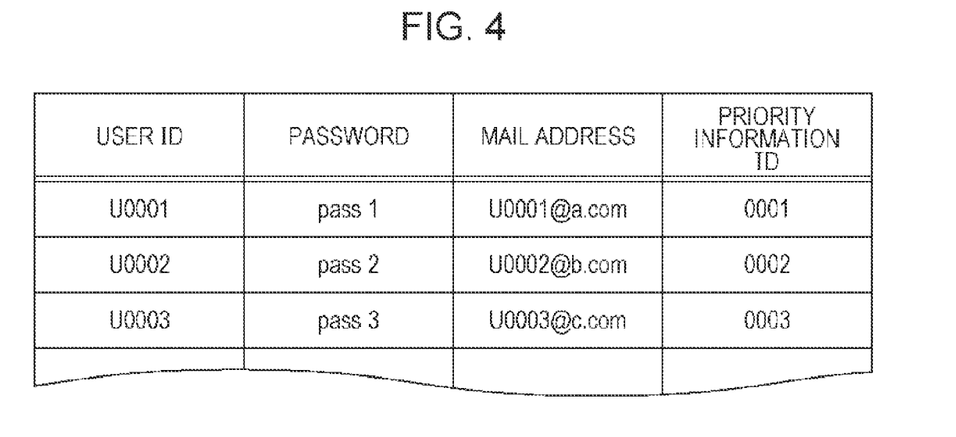
FIG. 4 illustrates an example of a user information management table.

FIG. 4 illustrates an example of a user information management table stored in the storage unit 32. As illustrated in FIG. 4, the user information management table stores the user ID for identifying the user, the password of the user, the destination address (mail address) of the user, and the identifier (priority information ID) of the priority information.

Figure 5:
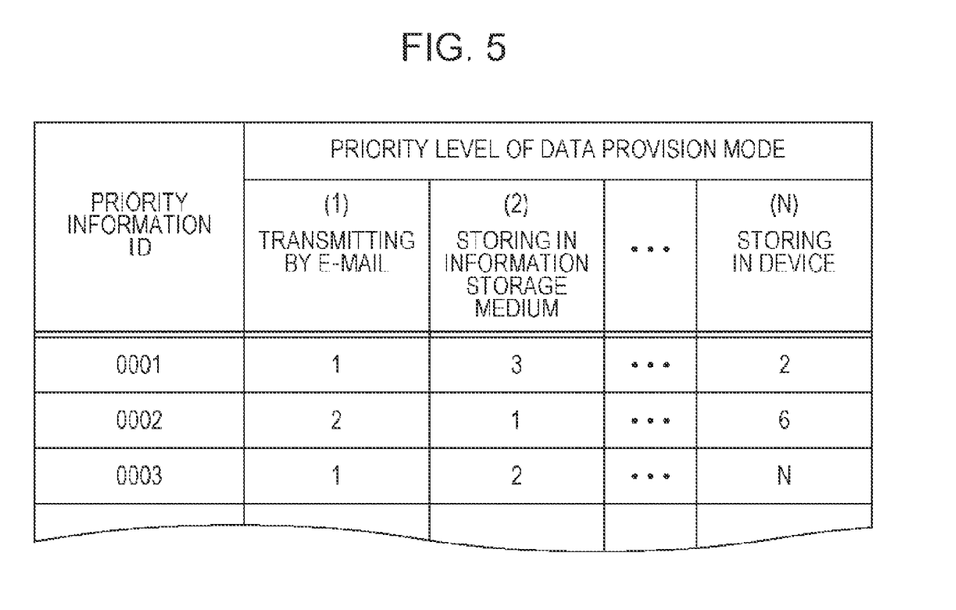
FIG. 5 illustrates an example of a priority information management table.

FIG. 5 illustrates an example of a priority information management table stored in the storage unit 32. As illustrated in FIG. 5, the priority information management table defines the priority information ID for identifying the priority information, and the priority levels of the plural data provision modes. Note that the plural data provision modes may include, for example, a mode for transmitting data (scanned data) by e-mail, a mode for storing data (scanned data) in an information storage medium (for example, USB memory), and a mode for storing data (scanned data) in a device. The mode for storing data in a device is a mode for storing data (scanned data) in the storage unit 22 of the image processing apparatus 2 without transmitting the data to the destination, reporting the URL of the data to the destination, and providing the corresponding data when the URL is accessed. In the mode for storing in a device, an access key may be provided to the destination together with the URL, and the data may be provided when a correct access key is input to the URL.

The communication unit 33 includes, for example, a network interface card (NIC), and communicates with the image processing apparatus 2 by connecting to the network 7 via the NIC.

3. Description of Sequence

Next, processes performed in the image processing system 1 will be described in detail.

3-1. First Example

First, a process according to a first example will be described. In the first example, upon receiving a scan operation request from the user, the image processing apparatus 2 performs a scan operation so as to obtain scanned data, and processes the scanned data in a data provision mode determined on the basis of priority information associated with the user who issued the request.

3-1(1). Scanned Data Provision Process (Overall Sequence)

Figure 6:
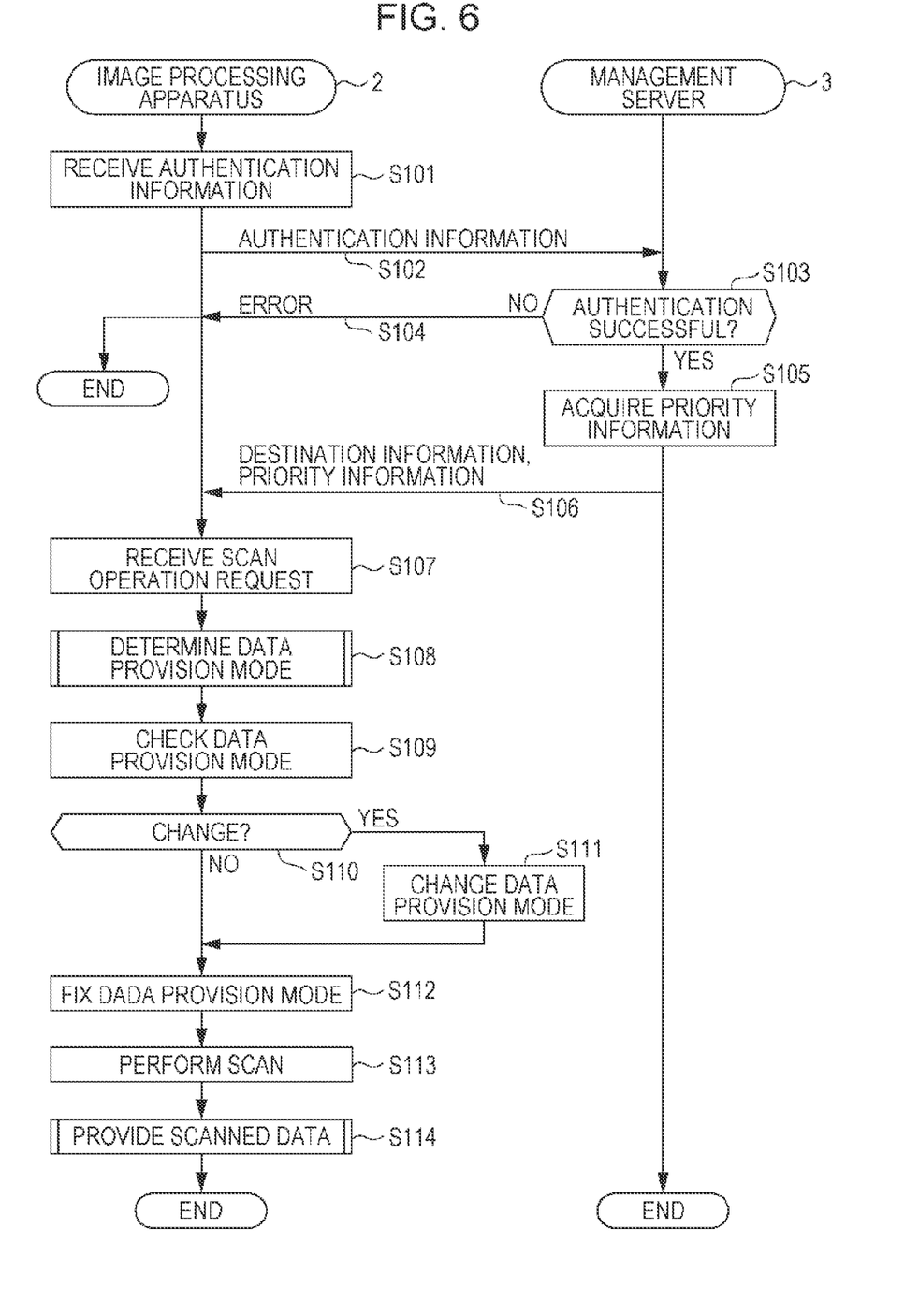
FIG. 6 is a sequence diagram illustrating the overall flow of a scanned data provision process according to a first example.

FIG. 6 is a sequence diagram illustrating the overall flow of a scanned data provision process according to the first example.

As illustrated in FIG. 6, the image processing apparatus 2 receives authentication information such as a user ID and a password entered by the user through the operation panel 25, for example (S101). Note that the authentication information of the user may be stored in an IC card. In this case, the image processing apparatus 2 may acquire the authentication information stored in the IC card by performing data communication. Then, the image processing apparatus 2 transmits the authentication information received from the user to the management server 3 (S102).

The management server 3 performs an authentication operation on the basis of the authentication information received from the image processing apparatus 2. If the authentication fails (for example, if a combination of the user ID and password contained in the authentication information does not match a combination of the user ID and password stored in the user information management table) (S103: N), the management server 3 reports an authentication error to the image processing apparatus 2 (S104). Then, the process ends. On the other hand, if the authentication based on the authentication information received from the image processing apparatus 2 succeeds (for example, if a combination of the user ID and password contained in the authentication information matches a combination of the user ID and password stored in the user information management table) (S103: Y), the management server 3 reads and acquires destination information and priority information associated with the user ID from the user information management table and the priority information management table, respectively (S105). For example, the destination information may include e-mail address if the e-mail address specified as the destination of the user is stored in the user information management table. The priority information may include information on the priority level of each data provision mode stored in the priority information management table. Then, the management server 3 transmits the destination information and priority information acquired in step S105 to the image processing apparatus 2 (S106).

Subsequently, the image processing apparatus 2 receives a scan operation request from the user through the operation panel 25, for example (S107). Then, the image processing apparatus 2 determines a data provision mode for the user of the scanned data on the basis of the destination information and the priority information received from the management server 3 (S108). This data provision mode determination process will be described in detail with reference to the flowchart of FIG. 7.

3-1(2). Data Provision Mode Determination Process

Figure 7:
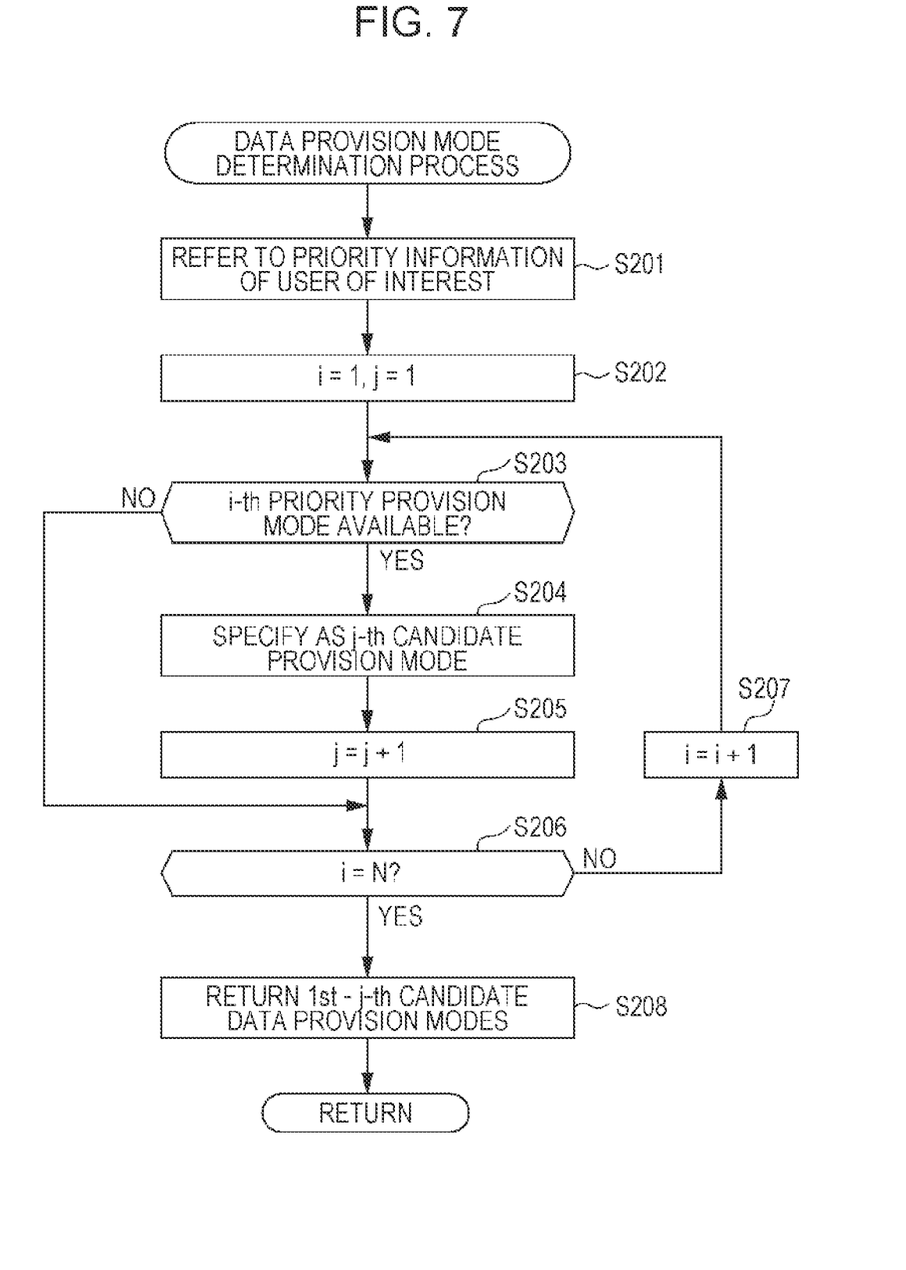
FIG. 7 is a flowchart illustrating a data provision mode determination process.

As illustrated in FIG. 7, the image processing apparatus 2 refers to the priority information (the priority information indicates data provision modes of the first through N-th priority) of the user of interest (the user specified by the authentication information) (S201), initializes both variables i and j to 1 (S202), and performs the following operations.

First, the image processing apparatus 2 selects a data provision mode of the i-th priority, and determines whether the data provision mode of the i-th priority is available (S203).

For example, in the case where the i-th priority data provision mode is a mode for transmitting scanned data by e-mail, if communication with the mail server 5 is available and the destination e-mail address of the user of interest is acquired, the image processing apparatus 2 may determine that the i-th priority data provision mode is available. On the other hand, if communication with the mail server 5 is not available or if the destination e-mail address of the user of interest is not acquired, the image processing apparatus 2 may determine that the i-th priority data provision mode is not available. Further, in the case where the i-th priority data provision mode is a mode for storing scanned data in the information storage medium 6, if the information storage medium 6 is connected thereto, the image processing apparatus 2 may determine that the i-th priority data provision mode is available. On the other hand, if the information storage medium 6 is not connected thereto, the image processing apparatus 2 may determine that the i-th priority data provision mode is not available. In the case where the i-th priority data provision mode is a mode for storing scanned data in a device (more specifically, a mode for storing scanned data in the image processing apparatus 2 and providing an URL for data acquisition in a printed form), the image processing apparatus 2 may determine that the i-th priority data provision mode is available regardless of the environment of the image processing apparatus 2.

If the image processing apparatus 2 determines that the i-th priority data provision mode is available in step S203 (S203: Y), the image processing apparatus 2 specifies the i-th priority data provision mode as a j-th candidate data provision mode (S204), and increments j (adds 1 to j) (S205). Then, the process proceeds to step S206. If the image processing apparatus 2 determines that the i-th priority data provision mode is not available in step S203 (S203: N), the process jumps to step S206.

If the variable i does not reach N (S206: N), the image processing apparatus 2 increments i (add 1 to i) (S207). Then, the process returns to step S203. If the variable i reaches N (S206: Y), the image processing apparatus 2 returns the first through j-th candidate data provision modes (S208). Then, the process exits from the data provision mode determination process.

Referring back to FIG. 6, a further description will now be given. As illustrated in FIG. 6, the image processing apparatus 2 checks with the user whether to provide data in, for example, the first candidate data provision mode, on the basis of the first through j-th candidate data provision modes determined in step S108 (S109). If a change request is received from the user (S110: Y), the image processing apparatus 2 changes the data provision mode to one of the second through j-th candidates in accordance with the request from the user (S111). If no change request is received from the user (S110: N), or after step S111, the image processing apparatus 2 fixes the data provision mode (S112), and performs a scan operation (S113) so as to obtain scanned data.

The image processing apparatus 2 processes (provides) the scanned data obtained in step S113, on the basis of the data provision mode fixed in step S112 (S114). This scanned data provision process will be described in detail with reference to the flowchart of FIG. 8.

3-1(3). Scanned Data Provision Process

Figure 8:
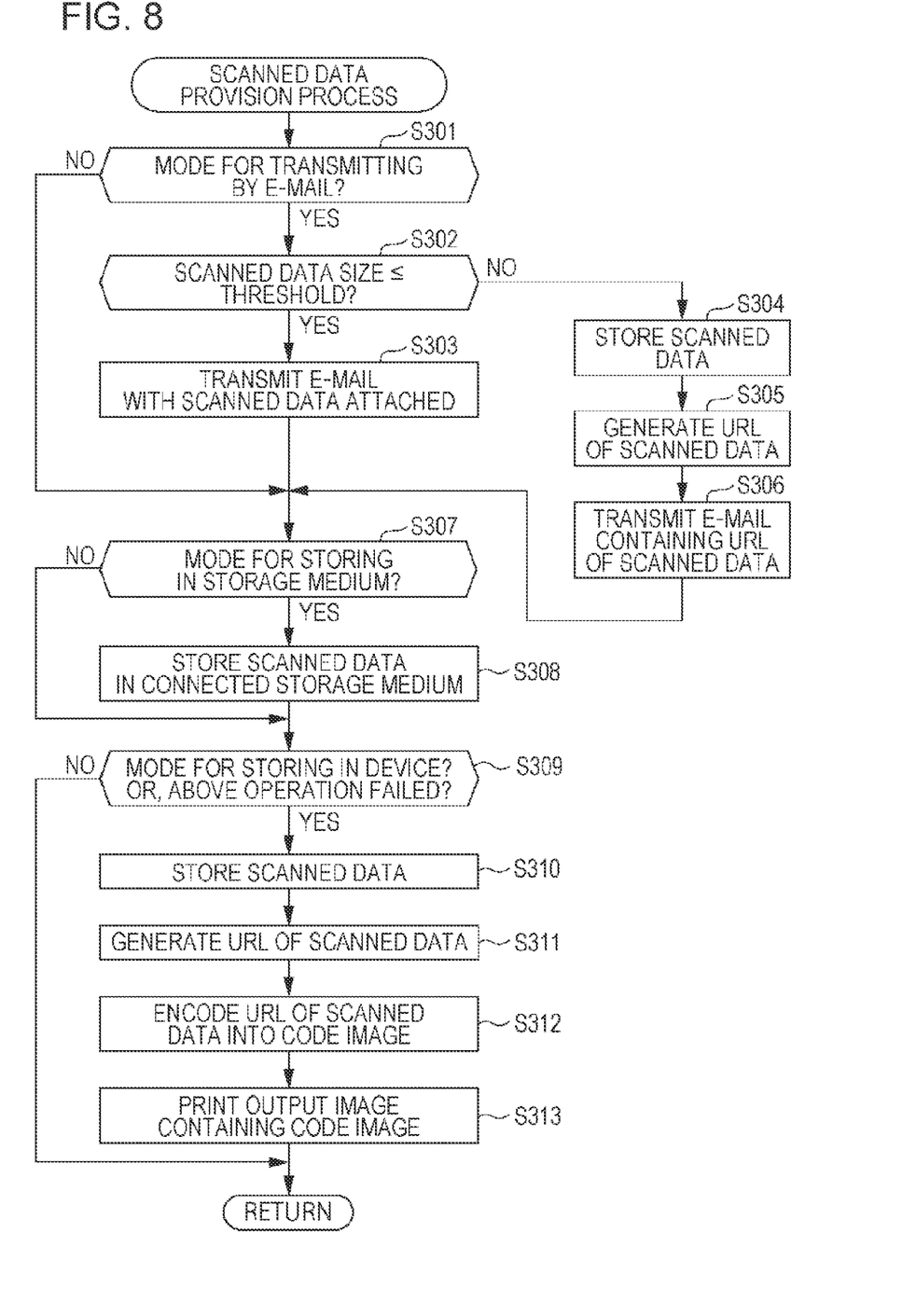
FIG. 8 is a flowchart illustrating a scanned data provision process.

As illustrated in FIG. 8, in the case where the data provision mode of scanned data is a mode for transmitting by e-mail (S301: Y), if the data size of the scanned data is less than or equal to a threshold (S302: Y), the image processing apparatus 2 transmits e-mail with the scanned data attached thereto to the destination e-mail address specified for the user (S303). On the other hand, if the data size is greater than the threshold (S302: N), the image processing apparatus 2 stores the scanned data in the storage unit 22 (S304), generates an acquisition URL for acquiring the scanned data from the outside (S305), and transmits e-mail containing the generated acquisition URL to the destination e-mail address specified for the user (S306). The e-mail may also contain a deletion URL for deleting the scanned data from the outside.

After step S303 or S306, or if the data provision mode of the scanned data is not a mode for transmitting by e-mail in step S301 (S301: N), the process proceeds to step S307.

If the data provision mode of the scanned data is a mode for storing in the information storage medium 6 (S307: Y), the image processing apparatus 2 stores the scanned data in the information storage medium 6 connected to the input/output interface 24 (S308).

After step S308, or if the data provision mode of the scanned data is not a mode for storing in the information storage medium 6 in step S307 (S307: N), the process proceeds to step S309.

If the data provision mode of the scanned data is a mode for storing in a device, or if the operation in step S303, S306, or S308 fails (S309: Y), the image processing apparatus 2 stores the scanned data in the storage unit 22 (S310), and generates an acquisition URL for acquiring the scanned data from the outside (S311). Then, the image processing apparatus 2 encodes the acquisition URL generated in step S311 into a one dimensional or two dimensional code image (S312), and prints an output image containing the encoded code image by the image forming unit 26 (S313). In this example, a code image obtained by encoding the URL is printed. However, the URL may be printed without being encoded, or may be displayed on the operation panel 25.

After step S313, or if the data provision mode of the scanned data is not a mode for storing in a device in step S309 or the operation in step S303, S306, or S308 succeeds (S309: Y), the process exits from the scanned data provision process and ends.

3-2. Second Example

Next, a process according to a second example will be described. In the second example, upon receiving a scan operation request from the user, the image processing apparatus 2 performs a scan operation so as to obtain scanned data, and processes the scanned data in a data provision mode determined on the basis of priority information associated with the user to whom the scanned data is to be provided.

3-2(1). Scanned Data Provision Process (Overall Sequence)

Figure 9:
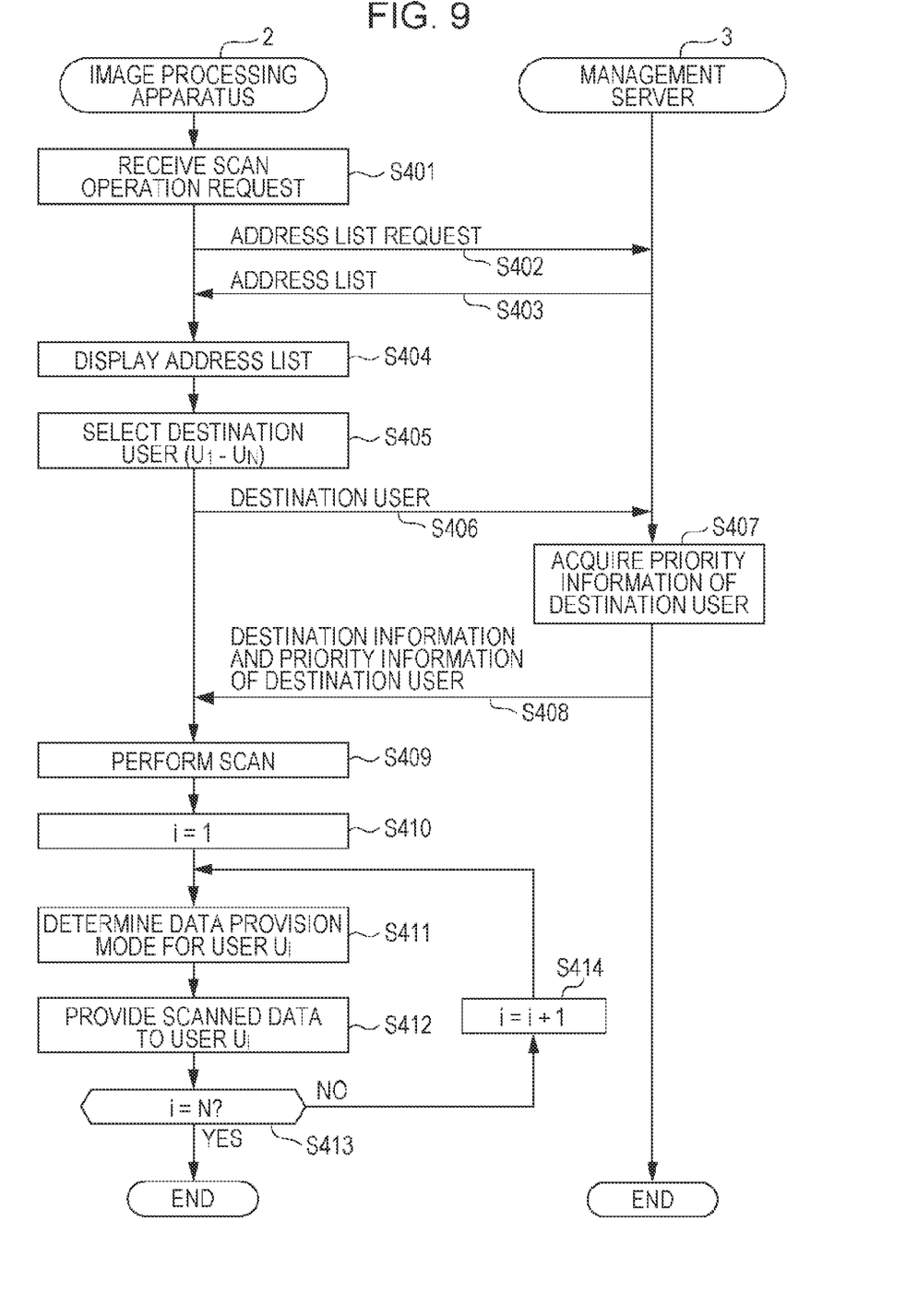
FIG. 9 is a sequence diagram illustrating the overall flow of a process of providing scanned data according to a second example.

FIG. 9 is a sequence diagram illustrating the overall flow of a scanned data provision process according to the second example.

As illustrated in FIG. 9, the image processing apparatus 2 receives a scan operation request from the user through the operation panel 25, for example (S401). Then, upon receiving a request for acquiring an address list, the image processing apparatus 2 requests the management server 3 to transmit the address list (S402). The management server 3 generates an address list containing destination information of each of one or more users on the basis of the user information management table, and transmits the address list (S403). For example, if a condition is specified by the user who issued the address list acquisition request, the management server 3 may generate an address list containing destination information of users who meet the condition. If no condition is specified by the user who issued the address list acquisition request, the management server 3 may generate an address list containing destination information of all the users included in the user information management table. In the second example, a user authentication operation may or may not be performed before the operation of step S401.

Subsequently, the image processing apparatus 2 displays the address list received from the management server 3 on the operation panel 25 (S404). The image processing apparatus 2 selects destination users ($U_1$ through $U_N$) to whom the scanned data is to be provided, from the users on the address list, on the basis of the information displayed on the operation panel 25 (S405). Then, the image processing apparatus 2 requests the management server 3 to acquire priority information of each of the destination users ($U_1$ through $U_N$) selected in step S405 (S406).

The management server 3 reads and acquires destination information and priority information associated with the user ID of each of the destination users ($U_1$ through $U_N$) specified by the request from the image processing apparatus 2, from the user information management table and the priority information management table, respectively (S407). Then, the management server 3 transmits the acquired destination information and priority information of each of the destination users ($U_1$ through $U_N$) to the image processing apparatus 2 (S408).

Upon receiving the destination information and priority information of each of the destination users ($U_1$ through $U_N$) transmitted in step S408, the image processing apparatus 2 performs a scan operation (S409) so as to obtain scanned data.

Then, the image processing apparatus 2 initializes the variable i to 1 (S410), and determines a data provision mode for the user $U_i$ on the basis of the destination information and the priority information of the user $U_i$ (S411). As for the data provision mode determination process, the flow is the same as that illustrated in FIG. 7, and a description thereof will be omitted. In this example, at least a first candidate data provision mode is determined for the user $U_i$.

The image processing apparatus 2 processes (provides) the scanned data obtained in step S409 for the user $U_i$, on the basis of the first candidate data provision mode determined in step S411 (S412). As for the details of this scanned data provision process, the flow may be the same as that illustrated in FIG. 8. Note that, in step S412, different URLs may be generated with respect to a single scanned data item for the respective users $U_1$ through $U_n$, and the different URLs generated for the respective users $U_1$ through $U_n$ may be stored in a scanned data management table (described below).

Figure 11:
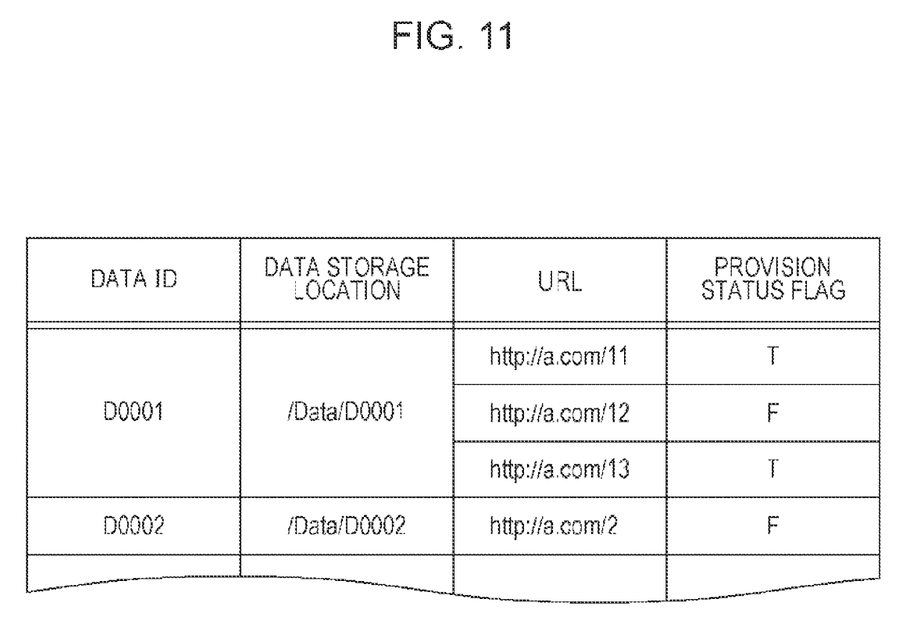
FIG. 11 illustrates an example of a scanned data management table.

FIG. 11 illustrates an example of a scanned data management table that is stored in the storage unit 22 of the image processing apparatus 2 and that stores URL information of scanned data. As illustrated in FIG. 11, the scanned data management table may store the data ID for identifying scanned data, the storage location of the scanned data, the URL for providing the scanned data to each user, and a scanned data provision status flag, in association with each other. Note that when the scanned data provision status flag is T (true), it indicates that the data is already provided, and when the scanned data provision status flag is F (false), it indicates that the data is not yet provided.

The above is the flow of the scanned data provision process according to the second example.

3-2(2). Process of Providing Scanned Data Stored in Image Processing Apparatus 2

Next, a description will be given of the flow of a process of providing the scanned data stored in the image processing apparatus 2 with reference to the sequence diagram of FIG. 10.

Figure 10:
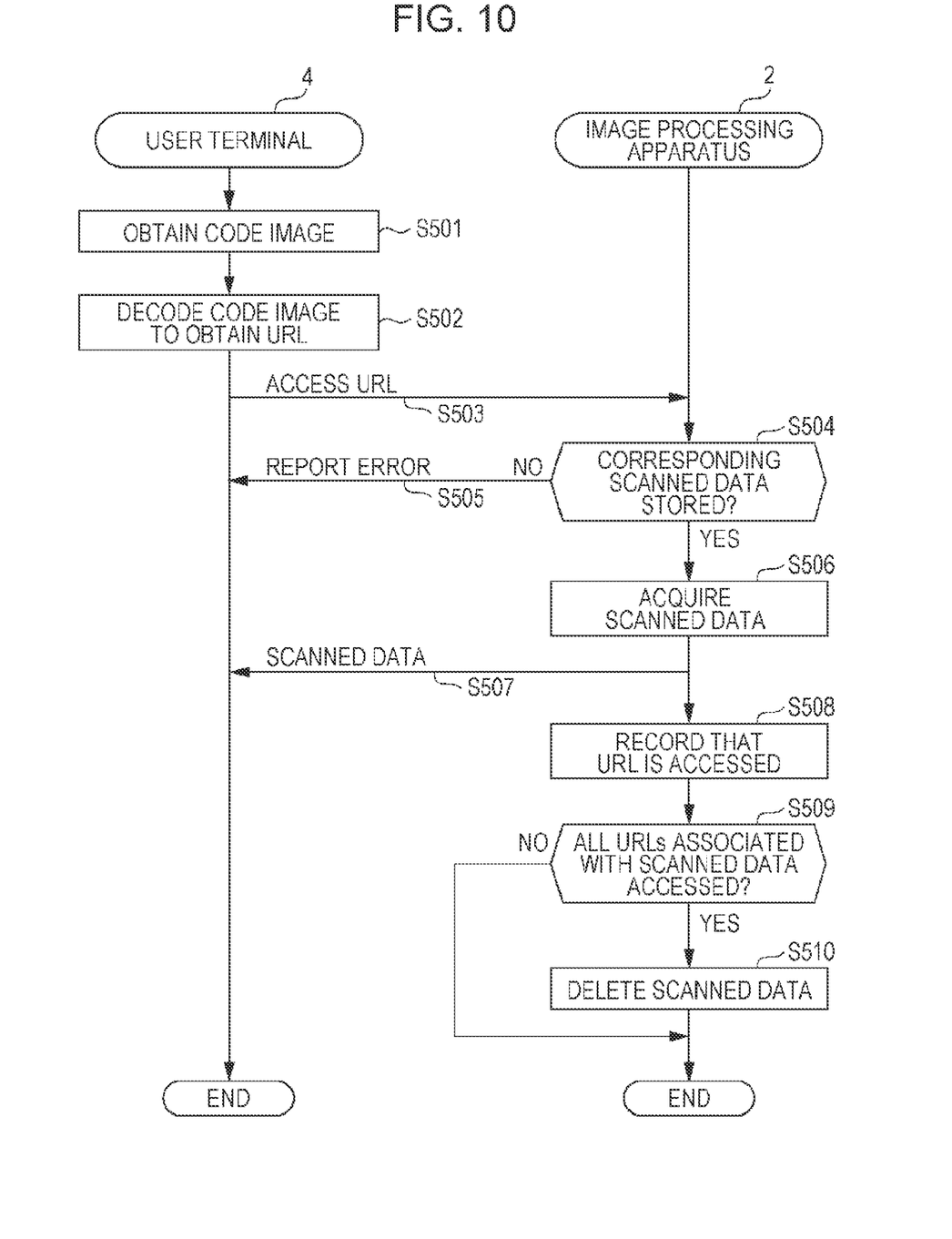
FIG. 10 is a sequence diagram illustrating a process of providing scanned data stored in the image processing apparatus.

As illustrated in FIG. 10, the user terminal 4 obtains a code image by taking a picture of a medium on which a code image using a camera thereof is printed, for example (S501). The user terminal 4 decodes the obtained code image so as to obtain a scanned data acquisition URL encoded into the code image (S502). Then, the user terminal 4 accesses the scanned data acquisition URL in accordance with an operation by the user (S503).

Upon receiving an access based on the scanned data acquisition URL, the image processing apparatus 2 refers to, for example, the scanned data management table of FIG. 11, and determines so as to determine whether it is possible to provide scanned data corresponding to the URL (S504). If the accessed URL is stored in the scanned data management table, the image processing apparatus 2 determines that it is possible to provide the scanned data. On the other hand, if the accessed URL is not stored in the scanned data management table, the image processing apparatus 2 determines that it is not possible to provide the scanned data.

If it is not possible to provide the scanned data in step S504 (S504: N), the image processing apparatus 2 reports an error to the user terminal 4 (S505). Then, the process ends.

If it is possible to provide the scanned data in step S504 (S504: Y), the image processing apparatus 2 acquires the scanned data from the data storage location indicated in the scanned data management table (S506), and transmits the acquired scanned data to the user terminal 4 (S507).

After providing the scanned data in step S507, the image processing apparatus 2 updates the scanned data provision status flag for the URL that received the access to T (true) (S508). Then, if the scanned data provision status flags of the all the URLs associated with the provided scanned data indicates that the scanned data are already provided (S509:Y), the image processing apparatus 2 deletes the scanned data (S510) and deletes the record of the scanned data from the scanned data management table.

The above is the flow of the process of providing the scanned data stored in the image processing apparatus 2.

4. Variations

The present invention is not limited to the above exemplary embodiment. For example, although the image processing apparatus 2 acquires the destination information and the priority information of the user from the management server 3 in the above exemplary embodiment, the destination information and the priority information may be registered in advance in the image processing apparatus 2.

The scanned data provision mode is not limited to those described in the above exemplary embodiment, and may include modes for storing data in a file server, a personal computer, and a cloud server, for example. In these modes, the same process as that described above may be performed.

The data processing mode presented by the image processing apparatus 2 may be appropriately changed by the user. Further, the image processing apparatus 2 may present to the user all the available data processing modes such that the user selects a data processing mode to be used from the presented data processing modes. Further, the user may enter destination information when requesting a scan operation.

Even in the case where the scanned data is processed in a mode other than the mode for storing in a device, the image processing apparatus 2 may store the scanned data in a device.

The present invention is applicable not only to scanned data, but also to data obtained by other operations.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an image reading unit configured to read image data of a medium to be scanned in response to a request received from a user;
   an obtaining unit configured to obtain user information of the user;
   a determining unit configured to determine a delivery destination or a storage destination, to which the read image data is to be delivered or stored, on the basis of priority levels which are assigned in advance to a plurality of delivery destinations or storage destinations by the user; and
   a providing unit configured to provide the read image data to the delivery destination or the storage destination determined by the determining unit.

2. The information processing apparatus according to claim 1, further comprising:
   an outputting unit configured to, in response to the determining unit determining the storage destination, store the read image data and output an image containing an address information item for acquiring the stored read image data from the outside.

3. The information processing apparatus according to claim 1, further comprising:
   a generating unit configured to store the read image data and generate an address information item for acquiring the stored read image data from the outside,
   wherein the generating unit is configured to, when the read image data is to be provided to a plurality of users, generate different address information items for the respective plurality of users.

4. The information processing apparatus according to claim 1, wherein the plurality of delivery destinations or storage destinations include an address associated with the user, an external storage medium, and a destination for outputting an address for acquiring stored data from the outside.

5. The information processing apparatus according to claim 1, wherein the determining unit is configured to determine the delivery destination or the storage destination on the basis of availability of the plurality of delivery destinations or storage destinations.

6. The information processing apparatus according to claim 1, wherein the providing unit is configured to provide the read image data to the delivery destination or the storage destination by first determining whether an attempt to provide the read image data to the delivery destination or the storage destination has failed and, in response to determining that the attempt to provide the read image data to the delivery destination or the storage destination has failed, then instructing the image processing apparatus to store the read image data and to generate an acquisition uniform resource locator (URL) for subsequently providing the read image data to the delivery destination or the storage destination.

7. An information processing method comprising:
   reading image data of a medium to be scanned in response to a request received from a user;
   obtaining user information of the user;
   determining a delivery destination or a storage destination, to which the read image data is to be delivered or stored, on the basis of priority levels which are assigned in advance to a plurality of delivery destinations or storage destinations by the user; and
   providing the read image data to the delivery destination or the storage destination determined in the determining.

8. A non-transitory computer readable medium storing a program causing a computer to execute a process for processing information, the process comprising:
   reading image data of a medium to be scanned in response to a request received from a user;
   obtaining user information of the user;
   determining a delivery destination or a storage destination to which the read image data is to be delivered or stored, on the basis of priority levels which are assigned in advance to a plurality of delivery destinations or storage destinations by the user; and
   providing the read image data to the delivery destination or the storage destination determined in the determining.

9. An information processing apparatus comprising:
   an image reading unit configured to read image data of a medium to be scanned in response to a request received from a user;
   a selecting unit configured to select a destination user to whom the read image data is to be provided;
   a determining unit configured to determine a delivery destination or a storage destination, to which the read image data is to be delivered or stored, on the basis of priority levels which are assigned in advance to a plurality of delivery destinations or storage destinations by the destination user; and a providing unit configured to provide the read image data to the delivery destination or the storage destination determined by the determining unit.

\* \* \* \* \*